United States Patent
Morales et al.

(10) Patent No.: US 7,983,943 B2
(45) Date of Patent: Jul. 19, 2011

(54) METHOD AND SYSTEM FOR WORKFLOW PROCESS NODE SYNCHRONIZATION

(75) Inventors: Javier A. Morales, Irondequoit, NY (US); Michael E. Farrell, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 1320 days.

(21) Appl. No.: 11/138,555

(22) Filed: May 27, 2005

(65) Prior Publication Data
US 2006/0271927 A1 Nov. 30, 2006

(51) Int. Cl.
*G06F 9/44* (2006.01)
(52) U.S. Cl. ...................................... 705/7.27
(58) Field of Classification Search .................. 705/7.27
See application file for complete search history.

(56) References Cited

U.S. PATENT DOCUMENTS

| | | | | |
|---|---|---|---|---|
| 5,490,246 A * | 2/1996 | Brotsky et al. | | 715/763 |
| 5,584,036 A * | 12/1996 | Kashihara | | 718/102 |
| 6,078,982 A * | 6/2000 | Du et al. | | 710/200 |
| 7,120,680 B1 * | 10/2006 | Higgins et al. | | 709/220 |
| 7,478,120 B1 * | 1/2009 | Zhang | | 709/201 |
| 2002/0159087 A1 * | 10/2002 | Yoshida et al. | | 358/1.15 |
| 2002/0174201 A1 * | 11/2002 | Ramer et al. | | 709/220 |
| 2003/0055892 A1 * | 3/2003 | Huitema et al. | | 709/204 |
| 2005/0075544 A1 * | 4/2005 | Shapiro et al. | | 600/300 |
| 2005/0086384 A1 * | 4/2005 | Ernst | | 709/248 |
| 2007/0046994 A1 | 3/2007 | Morales et al. | | |

OTHER PUBLICATIONS

"PDF for Prepress Workflow and Document Delivery", Adobe System Incorporated, 1997.*

* cited by examiner

*Primary Examiner* — Romain Jeanty
*Assistant Examiner* — Pan Choy
(74) *Attorney, Agent, or Firm* — MH2 Technology Law Group LLP

(57) ABSTRACT

In a method of managing workflow, a selected node is modified. The modifications to the selected node are saved in a save event. At least one related node is determined for the selected node in response to a save event. The modifications are propagated to the at least one related node.

3 Claims, 7 Drawing Sheets

METHOD AND SYSTEM FOR WORKFLOW PROCESS NODE SYNCHRONIZATION

FIELD

This invention relates generally to workflows. More particularly, the invention relates to a method and system for workflow process node synchronization.

DESCRIPTION OF THE RELATED ART

Workflow programs such as FreeFlow™ Process Manager are useful programs to their users. For example, a workflow program can lower the cost of prepress. Prepress may be the preparation of camera ready materials for printing. Prepress may also include typesetting, page layout, and proofreading. By reducing the amount of manual labor, the workflow programs can improve the efficiency of the entire printing process.

Despite the increase in automation, workflow programs still suffer drawbacks and disadvantages. For example, the use of automation in the prepress level may instill a certain amount of rigidity. A typical workflow may include the steps of a preflight, a color conversion, a watermark, imposition, and then followed by a print. This workflow can be helpful to the operator since he does not need to manually perform any of these operations for every job that comes through the shop. However, the typical workflow may be limited to the jobs with the same parameters.

In order to accommodate jobs with variations in parameters, conventional workflow programs typically require that the operator create additional workflows for each variation. For example, if the operator desired to skip a step, e.g., the watermark step (which adds the word "Proof" to the job) because the customer has already approved the job, the operator would be forced to create another identical workflow that did not include the watermark step. Although the two workflows would share identical process nodes, the difference of one process node necessitates the creation of the additional workflow. The creation of multiple workflows increases the chances of error in the automated workflow library.

Moreover, since each operation has pre-defined parameters, the workflow is only applicable to jobs of a specific type (e.g., a 6×9 paperback imposed 2 up left flip). If the operator wanted to impose the 6×9 paperback 3 up left flip or 4 up job, the operator would need to create additional workflows that would be identical in every step except for the imposition. Similarly, if the customer needs to print a 5.75×8.75 paperback, the operator would be forced to create additional workflows covering all the variations in impositions.

Combining the need for conditional steps with the need to handle slightly different jobs would most likely lead to many automated workflows. As the number of automated workflows increases, the workload and training of an operator to maintain and to know the parameters of the stored workflows increases. For example, an operation set up dozens of workflows based on his/her current prepress software (this operator had over 130 automated workflows). The operator was then forced to change preflight parameters in his/her workflows because the prepress software was incompatible with the PDF transparency model introduced in Acrobat™ 6. Thus, the potential for errors along with the time to correct the errors can be substantial. Accordingly, there is a need for a method and/or system for automatically synchronizing process nodes in the event of changes and/or modifications and thereby reducing errors and lowering costs.

SUMMARY

One embodiment pertains to a method of managing workflow. The method includes modifying a selected node and saving modifications to the selected node in a save event. The method also includes determining at least one related node to the selected node in response to a save event and propagating the modifications to the at least one related node.

Another embodiment relates to a computer readable storage medium on which is embedded one or more computer programs. The one or more computer programs implements a method of managing process nodes. The one or more computer programs include a set of instructions for modifying a selected node and saving at least one modification to the selected node in a save event. The set of instructions also include determining at least one related node to the selected node in response to a save event and propagating the at least one modification to the at least one related node.

Yet another embodiment pertains to a system for managing workflow. The system includes at least one processor, a memory coupled to the at least one processor, a workflow program and a node maintenance manager. The workflow program is configured to model and implement workflows where the workflow program is configured to be stored in the memory and executed by the at least one processor. The node maintenance manager is configured to interface with the workflow program and configured to be executed by the at least one processor and stored in the memory. The node maintenance manager is also configured to monitor a user saving at least one modification to a process node, determine at least one related process node to the selected process node in response to the saving at least one modification and to propagate the at least one modification to the related process node.

BRIEF DESCRIPTION OF THE DRAWINGS

Various features of the embodiments can be more fully appreciated as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of workflow systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to a method and system for managing nodes in a process workflow. More particularly, a process node manager may be configured to manage associations between nodes based on either a master association or a peer-to-peer association. When user designates a master association for a process node (e.g., a master node), the process node manager may be configured to propagate any changes or edits to the designated slave/client nodes in response to saving the changes in the master process node. It should be noted that slave/client nodes may not be directly editable. When a user designates a peer-to-peer association for a group of nodes, any changes to a peer within a peer-to-peer association is propagated to the rest of the group in response to the save event.

Figure 1:
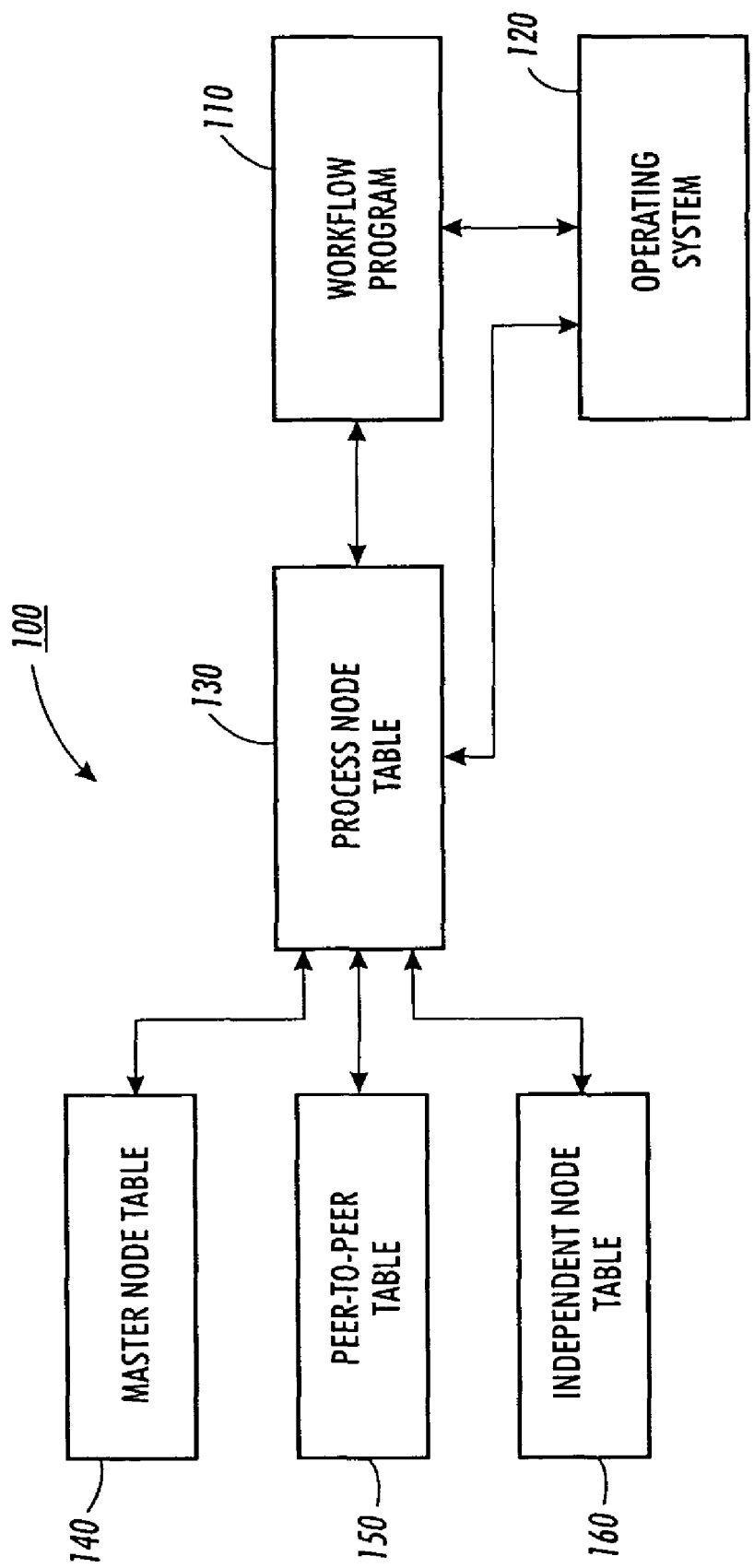
FIG. 1 illustrates an exemplary block diagram of a system in accordance with an embodiment.

FIG. 1 illustrates an exemplary block diagram of a system 100 in accordance with an embodiment of the invention. It should be readily apparent to those of ordinary skill in the art that the system 100 depicted in FIG. 1 represents a generalized schematic illustration and that other components may be added or existing components may be removed or modified.

As shown in FIG. 1, the system 100 includes a workflow program 110, an operating system 120, and a node maintenance manager 130. The workflow program 110 may be configured to model and implement workflow for processes such as printing, production lines, or other industrial/business applications. An example of a workflow program 110 may be FreeFlow™ Process Manager sold by Xerox, Inc. Although one embodiment of the node maintenance manager 130 may interface FreeFlow™ Process Manager, it should be readily apparent to those skilled in the art that other embodiments of the node maintenance manager may interface with other commercial workflow programs.

The workflow program 110 may interface with an operating system 120. The operating system 120 may be configured to manage the software applications, data and respective hardware components (e.g., displays, disk drives, etc.) as well as providing a platform to execute the workflow program 110 and the workflow node manager 130. The operating system 120 may be implemented by the MICROSOFT WINDOWS family of operating systems, UNIX, LINUX, and other similar operating systems.

The node maintenance manager 130 may be configured to interface with workflow manager 110. In other embodiments, the node maintenance manager 130 may be configured to interface with the operating system 120 or a combination of operating system 120 and the workflow manager 110. The node maintenance manager 130 may be further configured to manage associations between nodes based on either a master association or a peer-to-peer association. When a user designates a master association for a process node (e.g., a master node), the node maintenance manager 130 be configured to propagate any changes or edits to the designated slave/client nodes in response to saving the changes in the master process node based on the master relationship. When a user designates a peer-to-peer association for a group of nodes, any changes to a peer within a peer-to-peer association is propagated to the rest of the group by the node maintenance manager 130 in response to the save event.

The node maintenance manager 130 may also be configured to interface with workflow program 120 and to monitor for creation and/or editing of workflows. In one embodiment, the node maintenance manager 130 may be configured to track which nodes is designated in a master relationship (or association) or in a peer-to-peer association as the node is being created or edited. In another embodiment, the master and display relationship may be graphically represented, for example by lines or links. In yet other embodiments, the node maintenance manager 130 may be configured to maintain data structures (e.g., linked lists, hash tables, etc.) that track the nodes in a master relationship as well as the nodes that are in a peer-to-peer relationship. The establishment and/or dissolution of relationships in one relationship have no effect on associations/relationships in other workflows.

The node maintenance manager 130 may also be configured to interface with master node table 140, the peer-to-peer node table 150, and independent node table 160 in some embodiments. The tables 140-160 may be data structures that provide a search or indexing feature, e.g., a linked list, a hash table or other similar structure. The master node table 140 may be configured to store information related to the identity of master process nodes and their associated clients/slave process nodes. The peer-to-peer node table 150 may be configured to store information related to identify of peer association groups and the identities of the process nodes within the each group. The independent node table 170 may be configured to store the identity of process nodes that have no affiliation with master or peer-to-peer relationships.

Although FIG. 1 illustrates the node maintenance manager 130 as being an individual component of the workflow program 110, it should be readily obvious to those skilled in the art that the functionality embodied in the node maintenance manager 130 may be implemented within the workflow program 110 as a sub-program, module, subroutine call or some combination thereof.

Figure 2:
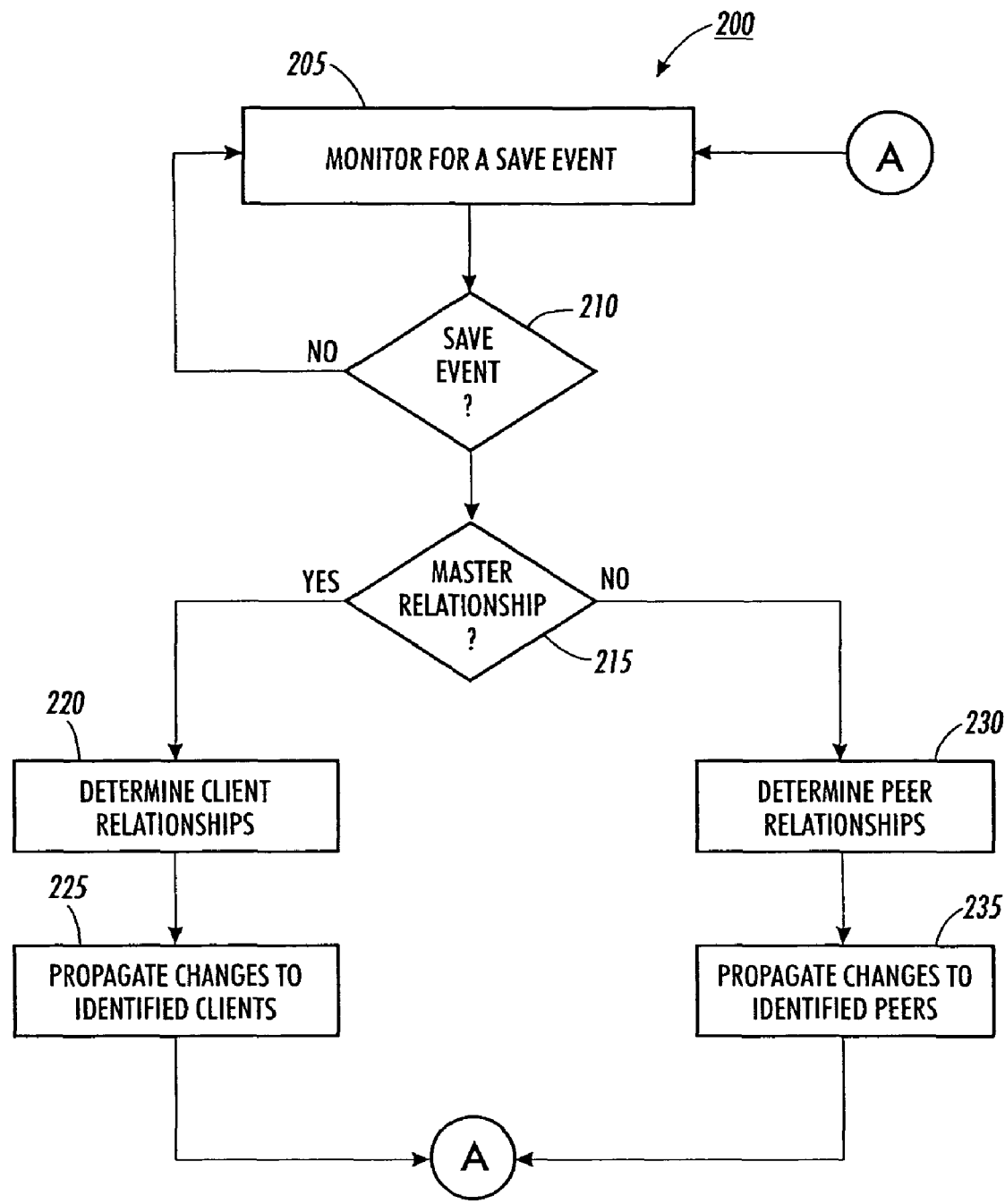
FIG. 2 illustrates an exemplary flow diagram implemented by the node maintenance manager in accordance with another embodiment.

FIG. 2 illustrates an exemplary flow diagram 200 implemented by the node maintenance manager 130. It should be readily apparent to those of ordinary skill in the art that this flow diagram 200 represents a generalized illustration and that other steps may be added or existing steps may be removed or modified.

As shown in FIG. 2, the node maintenance manager 130 may be configured to monitor for a save event in the workflow program 110, in step 205. The node maintenance manager 130 may monitor the communication between the workflow program 110 and the operating system 120 for the save event in one embodiment. In other embodiments, the node maintenance manager 130 may directly receive the save event from the workflow program 110 through a programming device such a callback function.

If a save event is not detected in step 210, the node maintenance manager 130 may be configured to return to a wait state and subsequently monitor for the save event. Otherwise, if the save event is detected in step 210, the node maintenance manager 130 may be configured to determine the type of relationship the selected node was previously designated. Within the save event, the workflow program 110 may provide metadata regarding the selected node which includes the relationship type along with data as well as modifications made to the selected-node.

In step 215, the node maintenance manager 130 may be configured to determine if the selected node was designated in a master relationship by examining the metadata associated with the selected node. If the node maintenance manager 130 determines that the selected node is a master node type, the node maintenance manager 130 may be configured to determine the client/slave process nodes associated with the selected node, in step 220. The node maintenance manager 130 may search the master node table 140 configured to store the identities of the master nodes and their designated client/slave process nodes. In other embodiments, other types of data structures may be utilize to store the identities of the master nodes and associated client/slave process nodes.

In step 225, the node maintenance manager 130 may be configured to propagate the modifications made to the selected node to the associated client/slave process nodes. The node maintenance manager 130 may retrieve each associated client/slave process node and initiate the same modifications that were done to the selected node. Subsequently, the node maintenance manager 130 may be configured to return to the wait state of step 205.

Returning to step 215, if the node maintenance manager 130 determines that the selected node is in a peer-to-peer relationship, the node maintenance manager 130 may be configured to search the peer-to-peer data tables 150 for peer group of the selected node, in step 230.

In step 235, the node maintenance manager 130 may be configured to propagate the modifications made to the selected node to the associated peer nodes. The node maintenance manager 130 may retrieve each associated per node and initiate the same modifications that were done to the selected node. Subsequently, the node maintenance manager 130 may be configured to return to the wait state of step 205.

Figure 3:
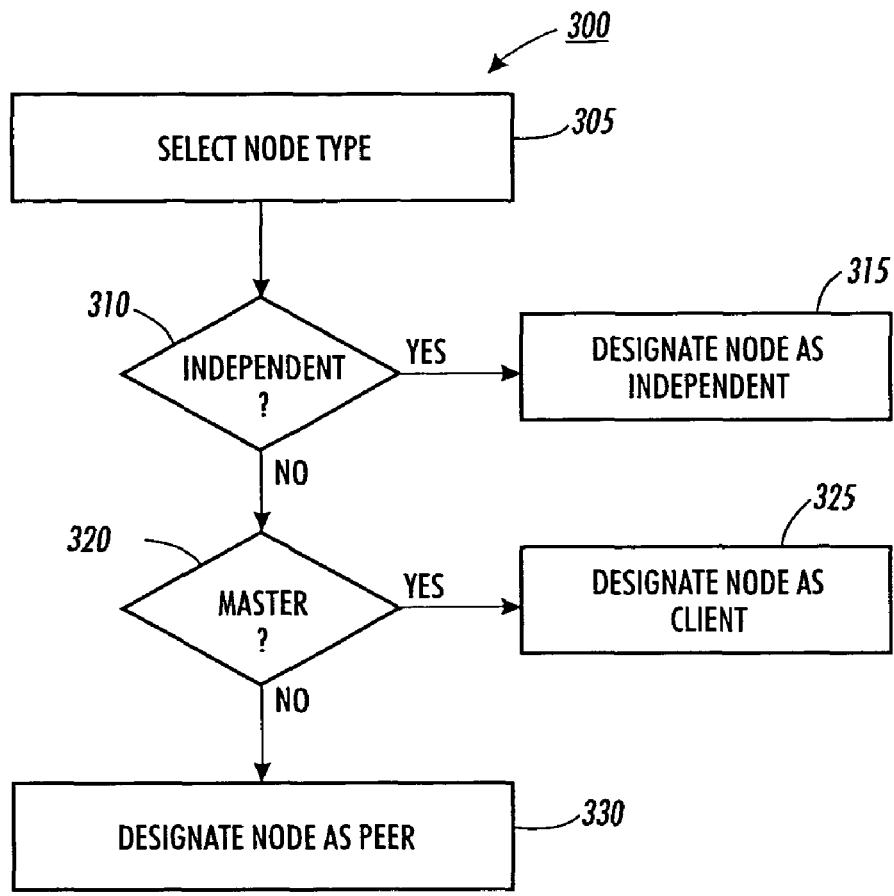
FIG. 3 illustrates an exemplary flow diagram implemented by the node maintenance manager in accordance with yet another embodiment.

FIG. 3 illustrates an exemplary flow diagram 300 for the node maintenance manager 130 in accordance with yet another embodiment of the invention. It should be readily apparent to those of ordinary skill in the art that this flow diagram 300 represents a generalized illustration and that other steps may be added or existing steps may be removed or modified.

As shown in FIG. 3, the node maintenance manager 130 may be configured to monitor the workflow program 110 for when a user initiates creation and/or editing of process nodes. If the node maintenance manager 130 determines that the user is configuring a process node, typically by the user initiating process node creation or editing function in the workflow program 110, the node maintenance manager 130 may be configured to receive the selection of the type of process node in step 305. In some embodiments, the node maintenance manager 130 may receive an interprocess message with the metadata associated with the selected process node. It should be readily obvious that other means of communications between computer processes could be used to contain the necessary information.

In step 310, the node maintenance manager 130 may be configured to determine if the selected process node was designated as independent node type. If the selected process is designated as independent, the node maintenance manager 130 may enter the identity of the selected node as independent in an independent node table in some embodiments, in step 315. In other embodiments, the node maintenance manager 130 may be configured to discard the information.

Otherwise, in step 320, the node maintenance manager 130 may be configured to determine if the process node is to be designated as a client/slave of one of a plurality of master nodes. If the selected process node is a client/slave of a designated master node, the node maintenance manager 130 may be configured to enter the identity of the selected process node in the master node table 140 linked with the designated master node, in step 325.

In some embodiments, the node maintenance manager 130 may graphically display the relationship between a master node and its associated client/slave nodes. More particularly, the node maintenance manager 130 may be configured to display a graphical artifact, e.g., a line segment, to indicate the relationship between the master node and its associated client/slave nodes. Additionally, the node maintenance manager 130 may indicate the master node in one color and the associated client/slave nodes in another color. Alternatively, the node maintenance manager 130 may use another graphical artifact, e.g., a geometrical figure, to represent the master node and yet another graphical artifact, e.g., a second geometrical figure, to present the client/slave nodes in other embodiments.

Otherwise, in step 330, the node maintenance manager 130 may be configured to designate the process node in a peer-to-peer relationship. The workflow program 110 may be configured to transmit the information related to the name of the association group that the selected peer belongs therein. The node maintenance manager 130 may enter the identity of the selected process node in peer association group table for the designated association group.

In some embodiments, the node maintenance manager 130 may graphically display the relationship of the peers in a peer-to-peer group. More particularly, the node maintenance manager 130 may be configured to display a graphical artifact, e.g., a line segment, to indicate the relationship between the peers of a peer-to-peer group. Additionally, the node maintenance manager 130 may indicate the peer nodes in one color and the peers of another peer-to-peer group in a second group.

Figure 4:
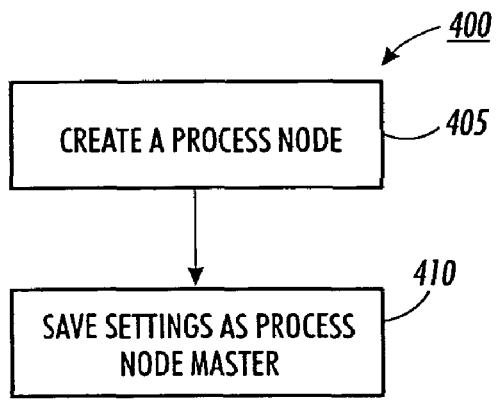
FIG. 4 illustrates an exemplary flow diagram implemented by the workflow program in accordance with yet another embodiment.

FIG. 4 illustrates an exemplary flow diagram 400 implemented by the workflow program 110. It should be readily apparent to those of ordinary skill in the art that this flow diagram 400 represents a generalized illustration and that other steps may be added or existing steps may be removed or modified.

As shown in FIG. 4, a user may initiate a menu command, function call, or other similar invocation to create a process node in the workflow program 110, in step 405. The workflow program 110 may be configured to allow the user to create the necessary work flow that to be implemented by the node. After the user completes the processes to be implemented by the process node, the user may designate the node as a master node, in step 410. This information along with other related workflow information (e.g., the identity of the node, identity of the workflow, etc.) may be saved as metadata. The metadata may then be forwarded to node maintenance manager 130 in subsequent communications and/or operations.

It should be noted that in other embodiments, in the event that a master process node is deleted, the master relationship between the client/slave process nodes is broken, i.e., not available for updates. However, the client/slave process nodes remain in their respective workflows and are converted to independent process nodes. Subsequently, the settings in these newly independent process nodes become editable. On the other hand, peer-to-peer associations continue to exist as long as there are member process nodes. These processes are described in greater detail hereinbelow with respect to FIGS. 7 and 8.

Figure 5:
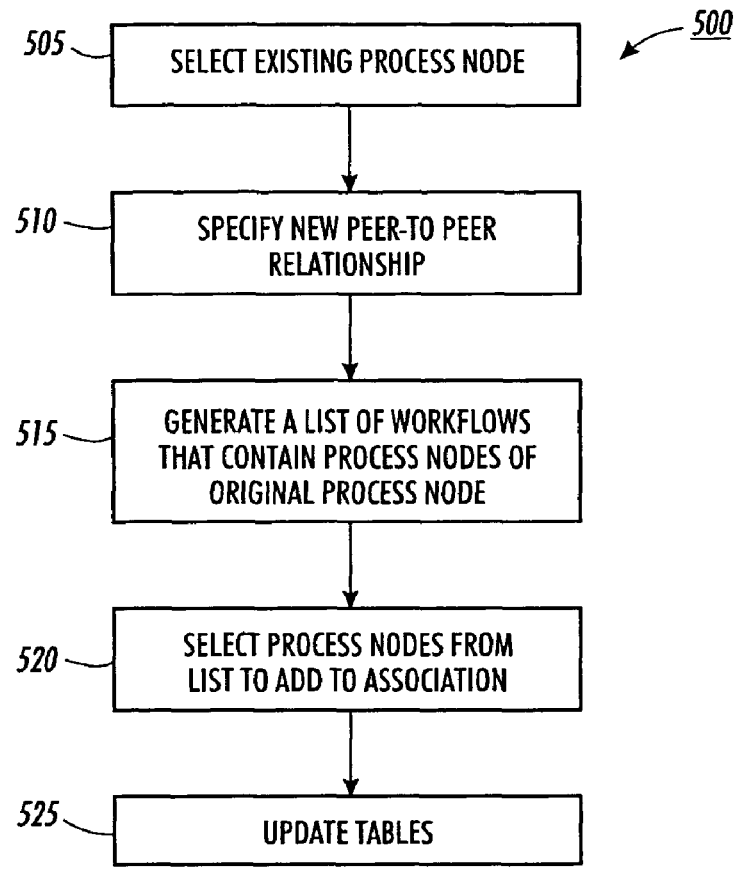
FIG. 5 illustrates an exemplary flow diagram implemented by the node maintenance manager in accordance with yet another embodiment.

FIG. 5 illustrates an exemplary flow diagram 500 implemented by the node maintenance manager 130 in accordance with yet another embodiment. It should be readily apparent to those of ordinary skill in the art that this flow diagram 500 represents a generalized illustration and that other steps may be added or existing steps may be removed or modified.

As shown in FIG. 5, the node maintenance manager 130 may be configured to monitor when a user selects in an existing process node in the workflow program 110, in step 505. The node maintenance manager 130 may receive interprocess communication from the workflow program 110 or, in other embodiments; the workflow program 110 may invoke a function callback to the node maintenance manager 130 for this functionality.

In step 510, the node maintenance manager 130 may be configured to receive the selection of the creation for a peer-to-peer relationship for the selected process node. In step 515, the node maintenance manager 130 may be configured to generate (or receive a list of) workflows that contain process nodes of the originally selected process node.

In some embodiments, the node maintenance manager 130 may be configured to ensure that a single process node belongs to a single association. More particularly, during the display of available workflows used in creating new associations automatically gray out or otherwise filter out process nodes that belong to another association.

In step 520, the node maintenance manager 130 may be configured to receive the selection of the user of process nodes to add to the peer-to-peer association group. Subsequently, the node maintenance manager 130 may be configured to add the identity of the peer-to-peer association group along with the members of the group to the peer-to-peer table 150, in step 525.

Figure 6:
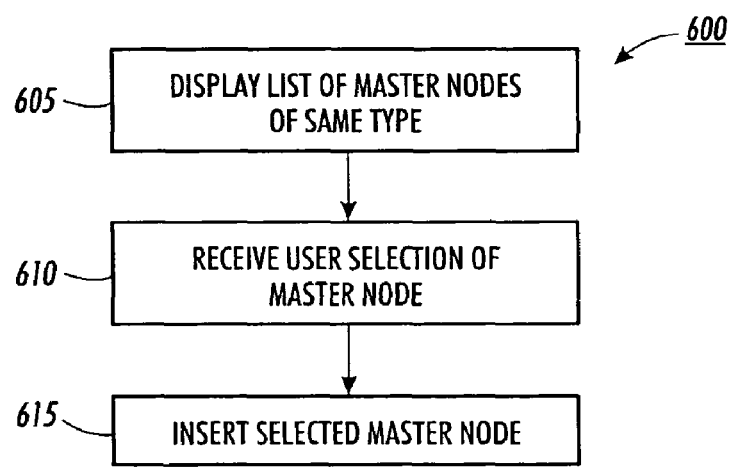
FIG. 6 illustrates an exemplary flow diagram implemented by the node maintenance manager in accordance with yet another embodiment.

FIG. 6 illustrates an exemplary flow diagram 600 implemented by the node maintenance manager 130 in accordance with another embodiment of the invention. It should be readily apparent to those of ordinary skill in the art that this flow diagram 600 represents a generalized illustration and that other steps may be added or existing steps may be removed or modified.

As shown in FIG. 6, the node maintenance manager 130 may be configured to monitor when a user selects the creation of master node by displaying a list of available master nodes, in step 605. The node maintenance manager 130 may implement this by using interprocess communication or other similar communication techniques discussed hereinabove.

In step 610, the node maintenance manager 130 may be configured to receive the selection of the master node by the user. Subsequently, the node maintenance manager 130 may be configured to store the designation of the master node in the master node table 140, in step 615.

Figure 7:
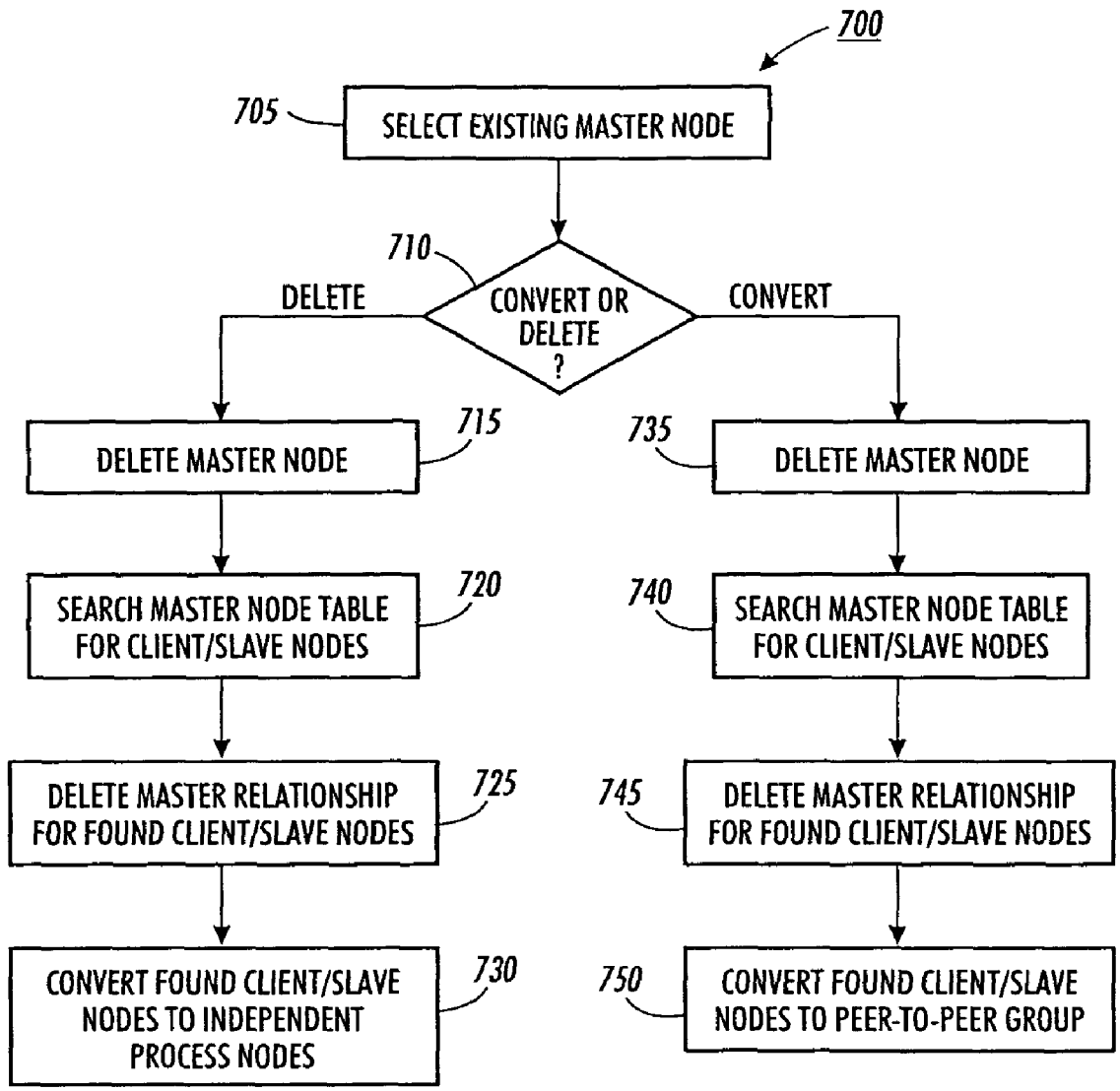
FIG. 7 illustrates an exemplary flow diagram implemented by the node maintenance manager in accordance with yet embodiment.

FIG. 7 illustrates an exemplary flow diagram 700 implemented by the node maintenance manager 130 in accordance with another embodiment of the invention. It should be readily apparent to those of ordinary skill in the art that this flow diagram 700 represents a generalized illustration and that other steps may be added or existing steps may be removed or modified.

As shown in FIG. 7, the node maintenance manager 130 may be configured to monitor if a user has selected an existing master node, in step 705. More particularly, the node maintenance manager 130 may receive interprocess communication from the workflow program 110 or, in other embodiments, the workflow program 110 may invoke a function callback to the node maintenance manager 130 for this functionality.

In step 710, the node maintenance manager 130 may be configured to determine whether the user has decided to delete the selected master node or to convert the client/slave nodes associated with the selected master node to a peer-to-peer group. More specifically, the workflow program 110 may be configured to provide option to create, edit, delete or to convert master nodes.

In step 715, if the user has selected to delete a master node, the node maintenance manager 130 may be configured to delete the master node from the master node table 140. In step 715, the node maintenance manager 130 may be further configured to search the master node table 140 (see FIG. 1) for the client/slave nodes associated with the selected master node.

In step 725, the node maintenance manager 130 may be configured store the identities of the client/slave nodes for the deleted master node and then delete the identities of the client/slave nodes from the master node table 140 (see FIG. 1).

In step 730, the node maintenance manager 130 may be configured to convert the deleted client/slave nodes into independent process nodes. More specifically, the node maintenance manager 130 may retrieve the identities of the client/slave nodes that were temporarily stored and store the identities as independent process nodes in the independent nodes table 160.

Returning to step 710, if the node maintenance manager 130 has received an indication from the workflow program 110 that the user has decided to convert the client/slave nodes associated with the selected master node into a peer-to-peer group, the node maintenance manager 130 may be configured to delete the selected master node from the master node table 140, in step 735. In step 740, the node maintenance manager 130 may be further configured to search the master node table 140 (see FIG. 1) for the client/slave nodes associated with the selected master node.

In step 745, the node maintenance manager 130 may be configured store the identities of the client/slave nodes for the deleted master node and then delete the identities of the client/slave nodes from the master node table 140 (see FIG. 1).

In step 750, the node maintenance manager 130 may be configured to convert the deleted client/slave nodes into a peer-to-peer group. More specifically, the node maintenance manager 130 may retrieve the identities of the client/slave nodes that were temporarily stored and store the identities as peer-to-peer in the peer node table 150.

Figure 8:
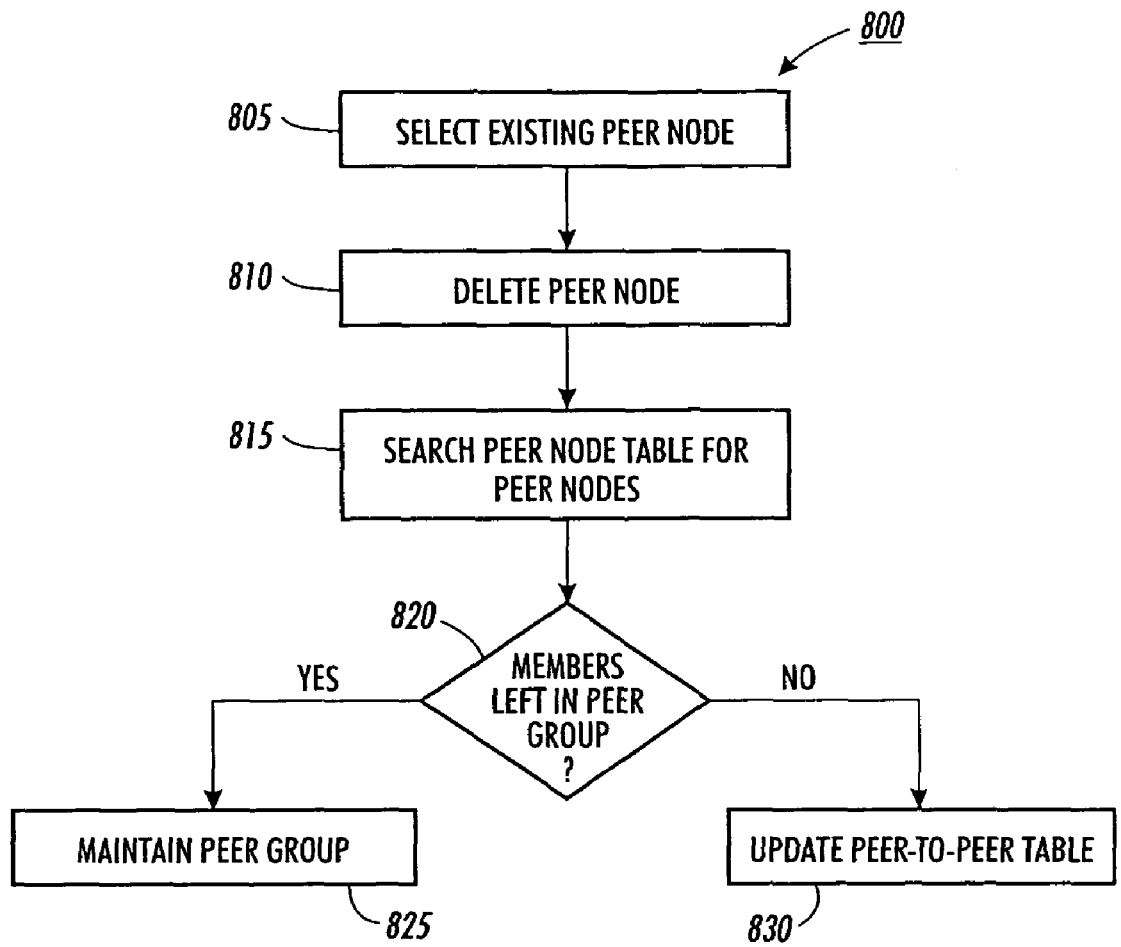
FIG. 8 illustrates an exemplary flow diagram implemented by the node maintenance manager in accordance with yet another embodiment.

FIG. 8 illustrates an exemplary flow diagram 800 implemented by the node maintenance manager 130 in accordance with another embodiment of the invention. It should be readily apparent to those of ordinary skill in the art that this flow diagram 800 represents a generalized illustration and that other steps may be added or existing steps may be removed or modified.

As shown in FIG. 8, the node maintenance manager 130 may be configured to monitor if a user has selected an existing peer node, in step 805. More particularly, the node maintenance manager 130 may receive interprocess communication from the workflow program 110 or, in other embodiments, the workflow program 110 may invoke a function callback to the node maintenance manager 130 for this functionality.

In step 810, the node maintenance manager 130 may receive an indication from the user of the workflow program 110 has decided to delete the selected master node. More specifically, the workflow program 110 may be configured to provide option to create, edit and/or delete peer-to-peer nodes. In this particular case, the user has selected to delete a peer node. This information has been communicated to the node maintenance manager 130 through an interprocess communication in one embodiment.

In step 815, the node maintenance manager 130 may be configured to search the master node table 150 (see FIG. 1) for the peer group associated with the selected peer node.

In step 815, the node maintenance manager 130 may be configured to determine whether the peer group associated with the selected peer node has any members. If the node maintenance manager 130 determines that members still exist in the associated peer group, the node maintenance manager 130 may be configured to maintain the peer group, in step 825. The node maintenance manager 130 may be configured to update the peer-to-peer table 150 with the deleted peer group, in step 830.

Otherwise, if the node maintenance manager 130 determines that a no member of the peer group exists, the node maintenance manager 130 may be configured to update the peer-to-peer table 150 by removing the peer group associated with the deleted peer, in step 830.

Although embodiments of the invention have been described with respect to prepress operations, the principles of the invention may be applied to other arts. For example, it may be applied to other workflow situations such as a digital front end (DFE). More specifically, the job programming in the DFE represents and automated workflow in which the order of the processing steps has been pre-defined. Embodiments of the invention may be implemented to synchronize subsets of the DFE job programming that relate to a specific operation, e.g., imposition.

Figure 9:
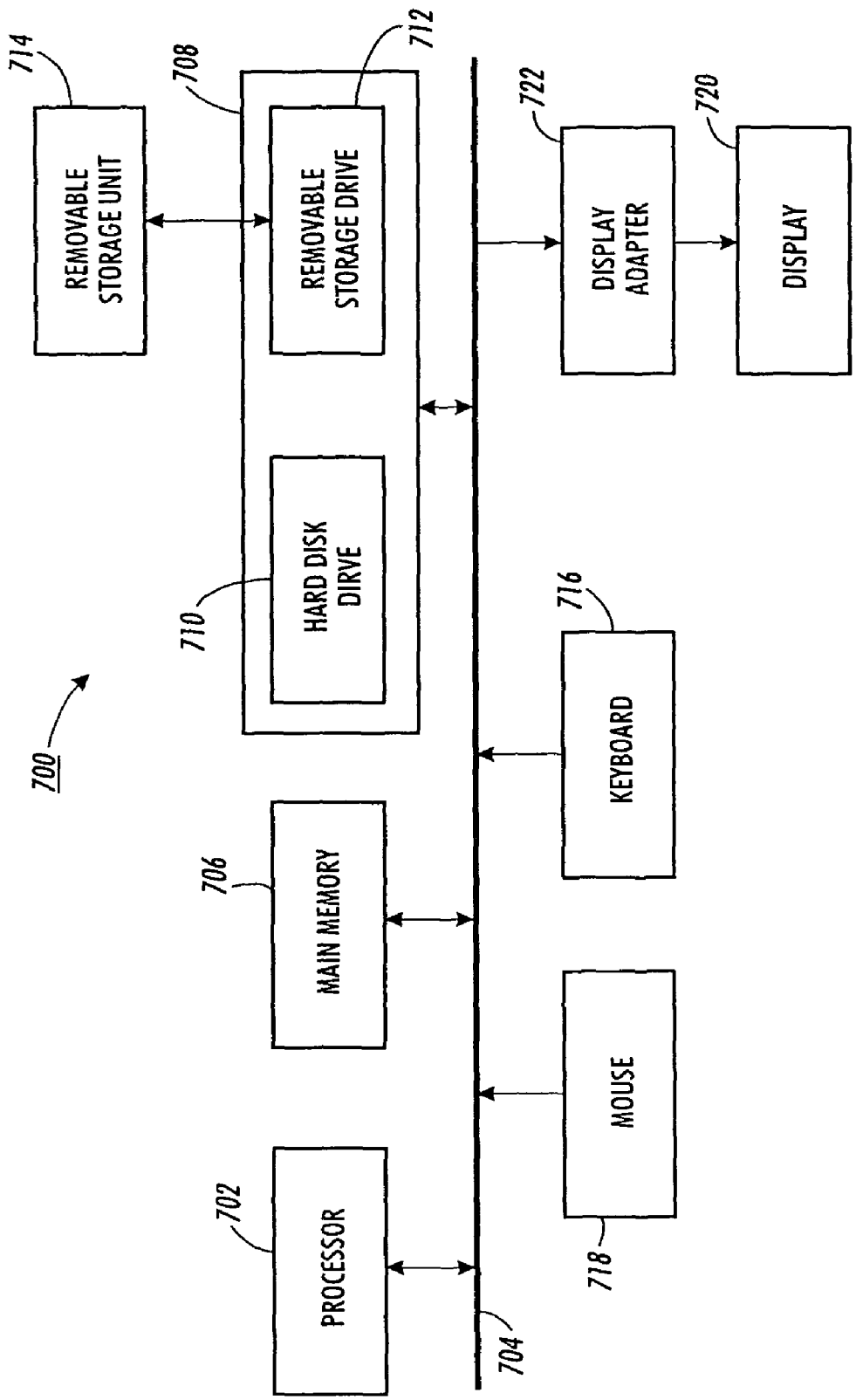
FIG. 9 illustrates a computer system where an embodiment may be practiced.

FIG. 9 illustrates an exemplary block diagram of a computer system 900 where an embodiment may be practiced. The functions of the node maintenance manager may be implemented in program code and executed by the computer system 900. The node maintenance manager 130 may be implemented in computer languages such as PASCAL, C, C++, JAVA, etc.

As shown in FIG. 9, the computer system 900 includes one or more processors, such as processor 902 that provide an execution platform for embodiments of the node maintenance manager. Commands and data from the processor 902 are communicated over a communication bus 904. The computer system 900 also includes a main memory 906, such as a Random Access Memory (RAM), where the software for the node maintenance manager may be executed during runtime, and a secondary memory 908. The secondary memory 908 includes, for example, a hard disk drive 920 and/or a removable storage drive 922, representing a floppy diskette drive, a magnetic tape drive, a compact disk drive, etc., where a copy of a computer program embodiment for the node maintenance manager may be stored. The removable storage drive 922 reads from and/or writes to a removable storage unit 924 in a well-known manner. A user interfaces with the node maintenance manager with a keyboard 926, a mouse 928, and a display 920. The display adaptor 922 interfaces with the communication bus 904 and the display 920 and receives display data from the processor 902 and converts the display data into display commands for the display 920.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A computer-implemented method of managing a printing workflow program, the method comprising:
    receiving an indication of a modification to a selected node corresponding to a prepress process step in the printing workflow program;
    saving the modification to the selected node in a save event;
    accessing, by a processor and in response to the save event, a table to determine a peer association group associated with the selected node;
    identifying at least one peer-to-peer node of the peer association group;
    propagating the modification to the at least one peer-to-peer node;
    selecting a pre-existing process node in the printing workflow program;
    specifying an association group for the pre-existing process node;
    providing a list of printing workflow programs that contain a same type of pre-existing process nodes as the pre-existing process node;
    selecting an additional pre-existing process node of the same type of the pre-existing process nodes from the list of printing workflow programs;
    adding the additional pre-existing process node to the association group;
    designating process nodes in the association group in a peer-to-peer relationship; and
    displaying a graphical artifact indicating the peer-to-peer relationship of the process nodes in the association group, wherein the steps of identifying, propagating, selecting, specifying, providing, adding, designating and displaying are performed by a processor.

2. A computer readable storage medium on which is embedded one or more computer programs, said one or more computer programs implementing a method of managing process nodes of a printing workflow program, said one or more computer programs comprising a set of instructions, when executed by a processor, for:
- receiving an indication of a modification to a selected node corresponding to a prepress process step in the printing workflow program;
- saving the modification to the selected node in a save event;
- accessing, in response to the save event, a table to determine a peer association group associated with the selected node;
- identifying at least one peer-to-peer node of the peer association group;
- propagating the modification to the at least one peer-to-peer node;
- receiving a selection for a pre-existing process node;
- identifying an association group for the pre-existing node;
- providing a list of printing workflow programs that contain a same type of pre-existing process nodes as the pre-existing process node;
- receiving a selection for an additional pre-existing process node of the same type of the pre-existing process nodes from the list of printing workflow programs;
- adding the additional pre-existing process node to the association group;
- designating process nodes in the association group in a peer-to-peer relationship; and
- displaying a graphical artifact indicating the peer-to-peer relationship of the process nodes in the association group.

3. A system for managing workflow, the system comprising:
- at least one processor;
- a memory coupled to the at least one processor;
- a printing workflow program configured to model and implement workflows wherein the printing workflow program is configured to be stored in the memory and executed by the at least one processor; and
- a node maintenance manager configured to interface with the printing workflow program and configured to be executed by the at least one processor and stored in the memory, wherein the workflow process manager is further configured to monitor a user saving at least one modification to a selected process node corresponding to a prepress process step in the printing workflow program, accessing, in response to the saving the at least one modification, a table to determine a peer association group associated with the selected process node, identify at least one peer-to-peer process node of the peer association group, propagate the at least one modification to the at least one peer-to-peer process node, select a pre-existing process node in the printing workflow program, specify an association group for the pre-existing process node, provide a list of printing workflow programs that contain a same type of pre-existing process nodes as the pre-existing process node, select an additional pre-existing process node of the same type of the pre-existing process nodes from the list of printing workflow programs, add the additional pre-existing process node to the association group, designate process nodes in the association group in a peer-to-peer relationship, and display a graphical artifact indicating the peer-to-peer relationship of the process nodes in the association group.

* * * * *